(12) United States Patent
Paffenholz et al.

(10) Patent No.: US 7,639,564 B2
(45) Date of Patent: Dec. 29, 2009

(54) 3-D TAU-P INTERPOLATION

(75) Inventors: Josef Paffenholz, Missouri City, TX (US); Kenneth L. Craft, Missouri City, TX (US)

(73) Assignee: Fairfield Industries Incorporated, Sugar Land, TX (US)

( * ) Notice: Subject to any disclaimer, the term of this patent is extended or adjusted under 35 U.S.C. 154(b) by 0 days.

(21) Appl. No.: 11/972,960

(22) Filed: Jan. 11, 2008

(65) Prior Publication Data

US 2009/0180351 A1 Jul. 16, 2009

(51) Int. Cl.
*G01V 1/00* (2006.01)
(52) U.S. Cl. .......................................... 367/38; 702/17
(58) Field of Classification Search ................ 367/38, 367/72, 49; 702/17
See application file for complete search history.

(56) References Cited

U.S. PATENT DOCUMENTS

| | | | |
|---|---|---|---|
| 5,189,644 A | 2/1993 | Wood | |
| 5,970,023 A | 10/1999 | Chambers et al. | |
| 6,018,500 A * | 1/2000 | Chambers | 367/73 |
| 6,721,662 B2 | 4/2004 | Wood | |
| 6,832,161 B1 | 12/2004 | Moore | |
| 7,058,514 B2 * | 6/2006 | Martin et al. | 702/17 |
| 2002/0042677 A1 | 4/2002 | West et al. | |

OTHER PUBLICATIONS

PCT International Search Report dated Feb. 25, 2009.

* cited by examiner

*Primary Examiner*—Jack W. Keith
*Assistant Examiner*—Krystine Saito
(74) *Attorney, Agent, or Firm*—Patterson & Sheridan, LLP

(57) ABSTRACT

Methods and apparatus for removing noise from signal traces collected during a seismic gather, particularly removing the aliased energy in the time-slowness (tau-P) domain so that aliasing noise does not lead to high noise levels in the inverse transformed data are provided. Removal of the aliasing noise may provide for quieter seismic traces and may increase the likelihood for successful three-dimensional (3-D) tau-P interpolation and detection of seismic events.

7 Claims, 14 Drawing Sheets

3-D TAU-P INTERPOLATION

BACKGROUND OF THE INVENTION

1. Field of the Invention

Embodiments of the present invention generally relate to techniques for processing seismic data and, more particularly, to removing noise and aliased energy in the tau-P domain for successful interpolation of seismic gathers.

2. Description of the Related Art

In the oil and gas industry, seismic surveys are one of the most important techniques for discovering the presence of subterranean hydrocarbon deposits. If the data is properly processed and interpreted, a seismic survey can provide geologists with a two-dimensional (2-D) or three-dimensional (3-D) representation of subsurface lithologic formations and other features, so that they may better identify those formations likely to contain oil and/or gas. Having an accurate representation of an area's subsurface lithologic formations can increase the odds of hitting an economically recoverable reservoir when drilling and decrease the odds of wasting money and effort on a nonproductive well.

A seismic survey is conducted by deploying an array of energy sources and an array of receivers in an area of interest. Typically, vibrator trucks are used as sources for land surveys, and air guns are used for marine surveys. The sources are discharged in a predetermined sequence, sending a downgoing seismic wavefield or signal into the earth that is partially reflected by subsurface seismic reflectors (i.e., interfaces between subsurface lithologic or fluid units having different elastic properties). The reflected or upgoing wavefield or signals (known as "seismic reflections") are then detected and converted to electrical signals by the array of receivers located at or near the surface of the earth, at or near the water surface, or at or near the seafloor. Each receiver records the amplitude of the incoming signals over time at the receiver's particular location, thereby generating a seismic survey of the subsurface. The seismic energy recorded by each seismic receiver for each source activation during data acquisition is generally referred to as a "trace." The seismic receivers utilized in such operations typically include pressure sensors, such as hydrophones, and velocity sensors, such as single or multi-component geophones. Since the physical location of the sources and receivers is known, the time it takes for a reflection wave to travel from a source to a sensor is directly related to the depth of the formation that caused the reflection. Thus, the recorded signals, or seismic energy data, from the array of receivers can be analyzed to yield valuable information about the depth and arrangement of the subsurface formations, some of which hopefully contain oil or gas accumulations.

This analysis typically begins by organizing the data from the array of receivers into common geometry gathers, where data from a number of receivers that share a common geometry are analyzed together. A gather will provide information about a particular location or profile in the area being surveyed. Ultimately, the data will be organized into many different gathers and processed before the analysis is completed in an effort to map the entire survey area. The types of gathers typically employed include common midpoint (i.e., the receivers and their respective sources share a common midpoint), common source (i.e., the receivers share a common source), common offset (i.e., the receivers and their respective sources have the same separation or "offset"), and common receiver (i.e., a number of sources share a common receiver). Common midpoint gathers are the most common type of gather at present because they allow the measurement of a single point on a reflective subsurface feature from multiple source-receiver pairs, thus increasing the accuracy of the depth calculated for that feature.

The data in a gather is typically recorded or first assembled in the time-offset domain. That is, the seismic traces recorded in the gather are assembled or displayed together as a function of offset (i.e., the distance of the receiver from a reference point) and of time. The time required for a given signal to reach and be detected by successive receivers is a function of its velocity and the distance traveled. Those functions are referred to as kinematic travel time trajectories. Thus, at least in theory, when the gathered data is displayed in the time-offset domain (the T-X domain), the amplitude peaks corresponding to reflection signals detected at the receivers should align into patterns that mirror the kinematic travel time trajectories. It is from those trajectories that one ultimately may determine an estimate of the depths at which formations exist.

A number of factors, however, make the practice of seismology and, especially, the interpretation of seismic data much more complicated than its basic principles. Primarily, the upgoing reflected signals that indicate the presence of subsurface lithologic formations are typically inundated with various types of noise. The most meaningful signals are the so-called primary reflection signals, those signals that travel down to the reflective surface and then back up to a receiver. When a source is discharged, however, a portion of the signal travels directly to receivers without reflecting off of any subsurface features. In addition, a signal may bounce off of a subsurface feature, bounce off the surface, and then bounce off the same or another subsurface feature, one or more times, creating so-called multiple reflection signals. Other portions of the detected signal may be noise from ground roll, refractions, and unresolvable scattered events. Some noise, both random and coherent, may be generated by natural and man-made events outside the control of the survey, such as wind noise.

All of this noise is detected along with the reflection signals that indicate subsurface features. Thus, the noise and reflection signals tend to overlap when the survey data are displayed in T-X space. The overlap can mask primary reflection signals, the so-called seismic events, and make it difficult or impossible to identify patterns in the display upon which inferences about subsurface geological strata may be drawn. Accordingly, various mathematical methods have been developed to process seismic data in such a way that noise is separated from primary reflection signals.

Many such methods seek to achieve a separation of signal and noise by transforming the data from the T-X domain to other domains, such as the frequency-wavenumber (F-K) or the time-slowness (tau-P) domains, where there is less overlap between the signal and noise data. Once the data is transformed, various mathematical filters are employed to the transformed data to eliminate as much of the noise as possible in an effort to enhance the primary reflection signals. The data is then inverse transformed back into the T-X domain for interpretation or further processing. For example, so-called Radon filters are commonly used to attenuate or remove multiple reflection signals. Such methods rely on Radon transformation equations to transform data from the T-X domain to the tau-P domain where it can be filtered. More specifically, the T-X data is transformed along kinematic travel time trajectories having constant velocities and slownesses, where slowness p is defined as the reciprocal of velocity ($p=1/v$).

The main problem with the tau-P interpolation is the presence of aliased energy in the tau-P domain. If left unchecked, the aliased energy may lead to high noise levels on the output where the tau-P data has been inverse transformed back into the T-X domain, rendering the tau-P technique unusable. One method to manage the aliased energy is the so-called high resolution Radon transform. In the high resolution Radon transform, the transform domain is forced to be maximally sparse, thereby eliminating the spurious aliased energy. Fast algorithms for high resolution 2-D Radon transforms exist and are known to those skilled in the art. However, these fast algorithms cannot be readily extended to three dimensions since the matrix structure does not have the required properties.

Accordingly, what is needed are techniques for dealing with aliasing noise in 3-D tau-P interpolation.

SUMMARY OF THE INVENTION

Embodiments of the present invention generally relate to reducing noise in traces from seismic gathers including the removal of aliasing noise in the tau-P (time-slowness) domain.

One embodiment of the present invention provides a method for removing aliasing noise from three-dimensional (3-D) tau-P data. The method generally includes decomposing the tau-P data into a plurality of frequency bands, wherein a template frequency band in the plurality of frequency bands does not contain aliasing noise and at least a portion of the other frequency bands constitute a subset of frequency bands for processing; calculating an envelope for the template frequency band and for each of the frequency bands in the subset to generate a plurality of envelope cuboids; for each frequency band in the subset from the lowest to the highest frequency band in the subset, multiplying an envelope cuboid associated with the present frequency band with an envelope cuboid associated with an adjacent lower frequency band or with the template frequency band to produce an envelope mask for the present frequency band, saving the envelope mask as the envelope cuboid associated with the present frequency band, and multiplying the envelope mask for the present frequency band with the tau-P data for the present frequency band to produce processed tau-P data for the present frequency band such that the aliasing noise is removed; and summing the tau-P data for the template frequency band and the processed tau-P data for each of the frequency bands in the subset to produce tau-P data without aliasing noise.

Another embodiment of the present invention provides a computer-readable medium containing a program for removing aliasing noise from 3-D tau-P data. When executed by a processor, the program performs operations that generally include decomposing the tau-P data into a plurality of frequency bands, wherein a template frequency band in the plurality of frequency bands does not contain aliasing noise and at least a portion of the other frequency bands constitute a subset of frequency bands for processing; calculating an envelope for the template frequency band and for each of the frequency bands in the subset to generate a plurality of envelope cuboids; for each frequency band in the subset from the lowest to the highest frequency band in the subset, multiplying an envelope cuboid associated with the present frequency band with an envelope cuboid associated with an adjacent lower frequency band or with the template frequency band to produce an envelope mask for the present frequency band, saving the envelope mask as the envelope cuboid associated with the present frequency band, and multiplying the envelope mask for the present frequency band with the tau-P data for the present frequency band to produce processed tau-P data for the present frequency band such that the aliasing noise is removed; and summing the tau-P data for the template frequency band and the processed tau-P data for each of the frequency bands in the subset to produce tau-P data without aliasing noise.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention provide techniques for removing noise from signal traces collected during a seismic gather, particularly removing the aliased energy in the time-slowness (tau-P) domain so that aliasing noise does not lead to high noise levels in the inverse transformed data. Removal of the aliasing noise may provide for quieter seismic traces and may increase the likelihood for successful three-dimensional (3-D) tau-P interpolation and detection of seismic events.

Some or all of the steps of the methods disclosed herein may be performed on any suitable computing system, such as a personal computer, a network server, or a supercomputer, as those skilled in the art will recognize. The steps of the methods described in connection with the present disclosure may be embodied directly in hardware, in a software module executed by a processor, or in a combination of the two. A software module may reside in any form of storage medium that is known in the art. Some examples of storage media that may be used include random access memory (RAM), read-only memory (ROM), flash memory, an EPROM (erasable ROM), an EEPROM (electrically erasable ROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

An Exemplary 3-D Tau-P Anti-Aliasing Scheme

Figure 1:
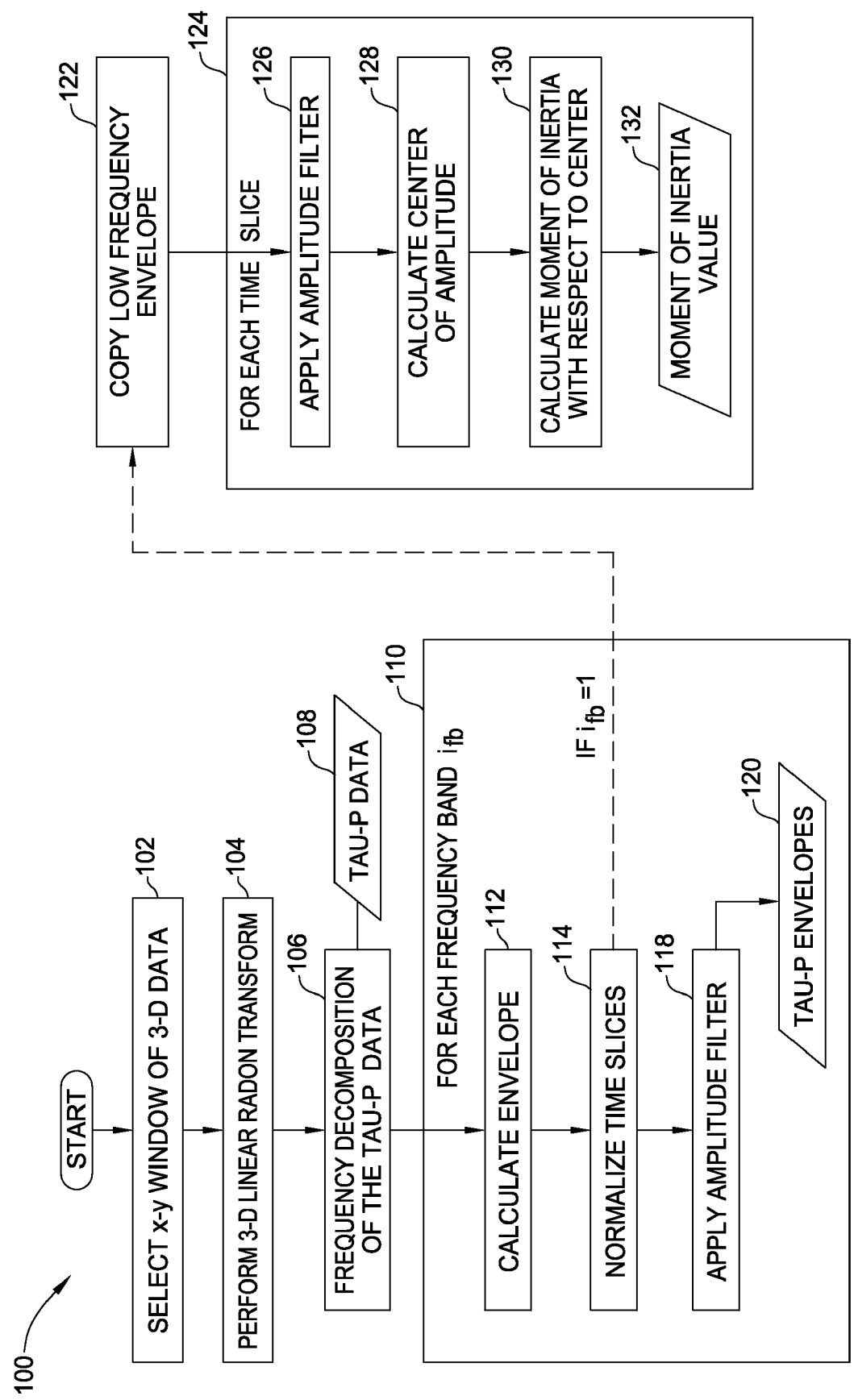
FIG. 1 is a flow diagram illustrating exemplary operations for calculating tau-P envelope templates in accordance with an embodiment of the present invention.
Figure 2:
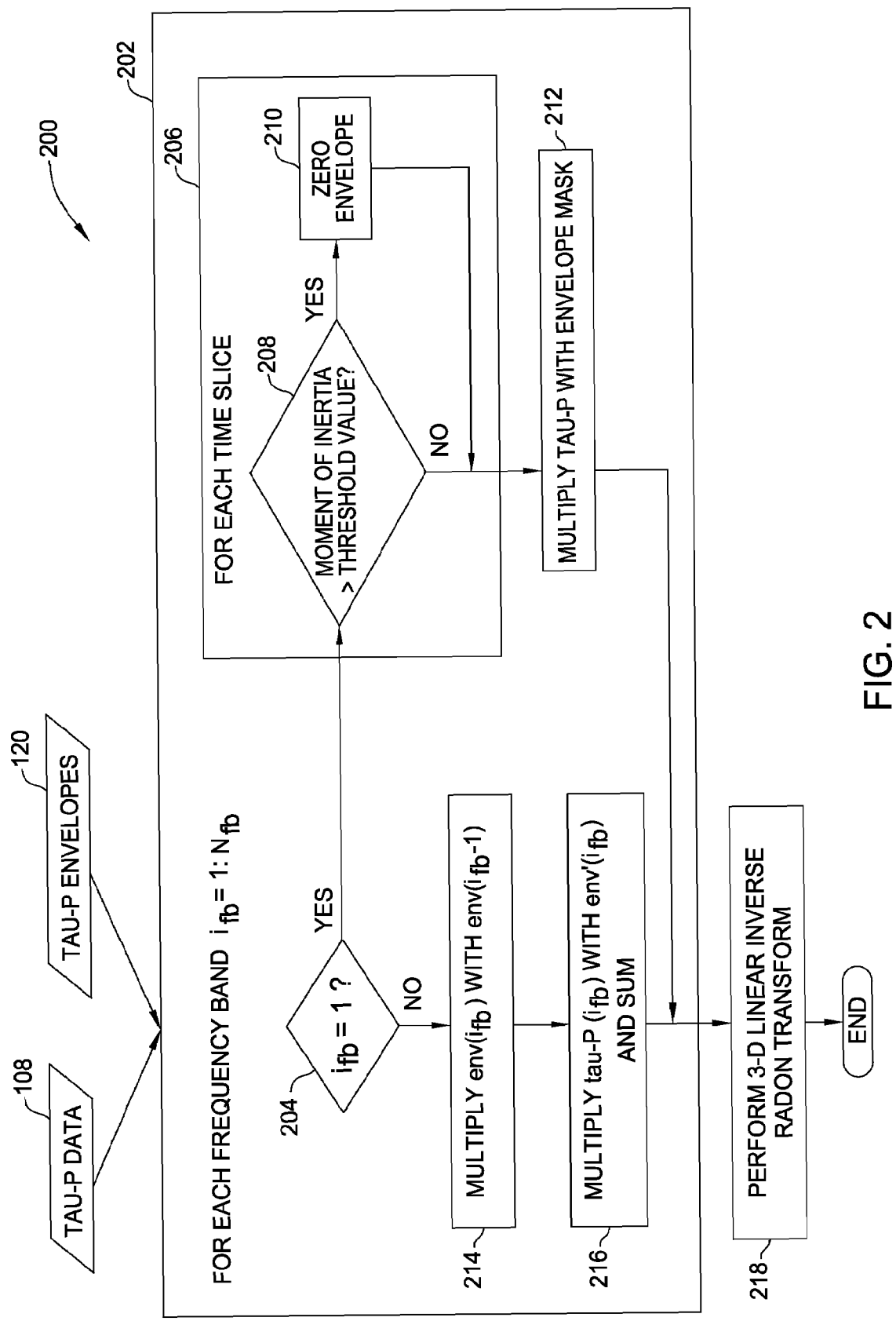
FIG. 2 is a flow diagram illustrating exemplary operations for applying the tau-P envelope templates calculated in FIG. 1 in an effort to remove aliasing energy in accordance with an embodiment of the present invention.

FIG. 1 illustrates a flow diagram 100 of example operations for calculating frequency-decomposed tau-P data 108 and filtered tau-P envelopes 120. The filtered tau-P envelopes 120 may then be utilized as tau-P envelope templates in an effort to remove the aliased energy from the frequency-decomposed tau-P data 108, as shown in FIG. 2.

The operations begin, at step 102, by selecting an x-y window of three-dimensional (3-D) seismic data from a gather in the time-offset (T-X) domain. As used herein, a window of seismic data generally refers to a subset (in position and/or time) of the seismic traces recorded during the gather. Limitations on the size of the x-y window of seismic data are described below. Instead of transforming the seismic data using a computationally intensive high resolution Radon transform, a fast, simple linear Radon transform may be performed at step 104 in an effort to transform the seismic data into the time-slowness (tau-P) domain.

At step 106, the tau-P data may be separated into a number of different frequency bands ($N_{fb}$). Typically, the tau-P data is divided into about 7 to 21 frequency bands. This frequency decomposition may be accomplished by any suitable means, such as with continuous wavelet transforms (CWTs) using Morlet or other wavelets or by bandlimited filtering of the tau-P data. For some embodiments, the frequency bands may have different bandwidths. The tau-P data 108 divided into different frequency bands may be saved for later use.

For each frequency band $i_{fb}$ in step 110, the envelopes of the frequency-decomposed tau-P data 108 may be calculated at step 112. Each envelope cube may be organized into a column of time-$P_x$-$P_y$ slices, stacked along the time axis. Each time slice may be normalized at step 114 such that the maximum value for each slice is one. Although the time-$P_x$-$P_y$ data arrangement is referred to as an "envelope cube," the time, $P_x$, and $P_y$ data need not have equal matrix dimensions. In other words, the envelope cube may not possess the shape of a true cube, where all six faces are the same size. In fact, the shape of an envelope cube may be thought of as a cuboid or a rectangular parallelepiped, even though it will be referred to hereafter as an "envelope cube."

Regardless whether the frequency band is the first frequency band ($i_{fb}=1$), the time slices of the envelope cube may be input into a nonlinear amplitude filter at step 118. In the nonlinear filter, the amplitude values of the time slices below a threshold value may be set to zero or attenuated, while amplitude values above the threshold value may be set to one. The purpose of the filter is to eliminate unfocused energy that may most likely lead to noise after the inverse transform from the tau-P domain and produce a filtered tau-P envelope 120, one for each frequency band. As the result of steps 102-118, the filtered tau-P envelope 120 for each frequency band may be stored in memory for later use. For some embodiments, the threshold value may be selected by the user, perhaps at runtime. Also for some embodiments, the threshold value may be different for the various envelope cubes corresponding to the different frequency bands.

For some embodiments, the transition at the threshold value between attenuating and amplifying the amplitude values may be an abrupt change at the threshold value, such that the nonlinear amplitude filter is a piecewise linear function. For other embodiments, the amplitude filter may have a smoother transition region with any suitable function for joining the two halves of the filter on either side of the threshold value, such as a sloped line, a parabolic curve, or a polynomial function. The transition function may be preprogrammed or user-selectable, and, in the case of a user-selectable transition, the function may be selected at run-time and may be different for the various envelope cubes for some embodiments.

If the bandwidth of the frequency band containing the lowest frequency data is chosen correctly, the lowest frequency band ($i_{fb}=1$) may be expected to contain little or no aliased energy. Therefore, after applying the amplitude filter, a "clean" envelope cube, from which noise has been removed or attenuated, may be generated. This resulting low frequency cube may serve as a template for the higher frequency cubes. By comparing areas of the low frequency cube having little or no energy (i.e., low envelope amplitude), those areas may be suppressed in higher frequency cubes. In practice, this may be accomplished by multiplying the present envelope cube with the envelope cube corresponding to the next lowest frequency band, which will be described in further detail below with respect to FIG. 2. Such multiplication may ensure that areas which are suppressed in a lower frequency band are also rejected in the next higher band, even if high amplitude aliased energy survived the amplitude filtering at step 118.

The linear Radon transform maps linear seismic events into points in the Radon domain. In contrast, curved events are smeared out over an extended P-range. Such smeared events may be treated by the algorithm as aliased noise and attenuated. Therefore, the x-y window of seismic data traces used in the interpolation may be selected at step 102 to be suitably short (e.g., 10 traces) in an effort to minimize curvature in this window. However, using a small window may lead to the troubling artifact of edge effects in the tau-P domain.

Unlike aliased energy, the edge effects may appear in the lowest frequency cube and, therefore, may prevent using the low frequency cube as an appropriate template for the higher frequency cubes. For example, the edge effects may appear to have focused energy (i.e., amplitudes above the threshold value) in the lowest frequency cube that is mistaken for seismic signal energy and is not attenuated by the amplitude filter in step 118. When the resulting filtered envelope cube is used as a template for the envelope cube associated with the next higher frequency band, the defective template may improperly allow aliased energy and other noise to remain in the area(s) of the edge effects. Therefore, it may be desirable to remove the edge effects before using the filtered envelope cube corresponding to the lowest frequency band as a template.

To this end, if the frequency band is the lowest frequency band ($i_{fb}=1$), the low frequency envelope may be copied at step 122. For each normalized time slice at step 124, an amplitude filter may be applied at step 126 in an effort to remove or attenuate noise from the time slice, leaving only the focused signal energy. This amplitude filter may be the same or different (regarding the threshold value and the shape of the filter function) than the nonlinear amplitude filter applied at step 118 and may have an abrupt or a smooth transition around the threshold value as described above. Also as described above, the threshold value and/or the shape of the transition region may be user-selectable for the filter applied at step 126. For some embodiments where the amplitude filter applied at step 126 is to be the same as the filter of step 118, the filtered tau-P envelope 120 may be copied and used instead of the pre-filtered low frequency envelope cube copied in step 122, and step 126 where a separate amplitude filter is applied may be skipped.

At step 128, the center of amplitude (comparable to the center of mass) may be calculated for each normalized time slice. This may be followed at step 130 by calculation of the rotational moment of inertia 132 for each time slice in an effort to distinguish between focused seismic events and unfocused energy due to edge effects. The rotational moment of inertia 132 may be calculated with respect to the center of amplitude for the corresponding time slice.

Figure 3:
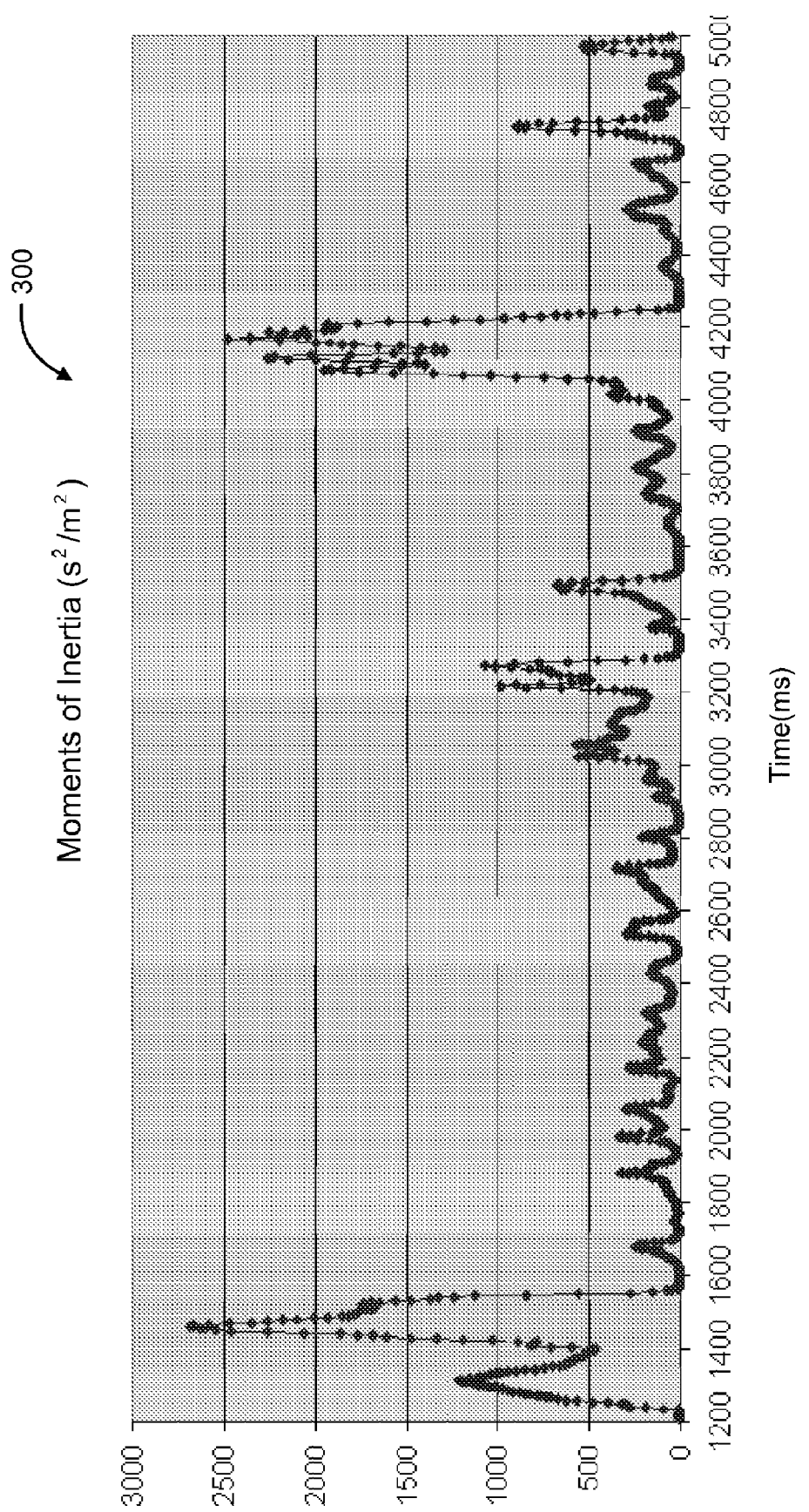
FIG. 3 is a graph of rotational moments of inertia for each time slice in the low frequency band envelope in accordance with an embodiment of the present invention.

FIG. 3 is an exemplary graph 300 of rotational moments of inertia 132 for each time slice in the low frequency band envelope. Each point represents the moment of inertia 132 calculated for a certain time slice in seconds squared per meters squared ($s^2/m^2$). A small moment of inertia (e.g., occurring at the time slices for approximately 1600 ms and 3600 ms in the graph 300 of FIG. 3) may indicate a seismic event due to the focused energy. In contrast, a large moment of inertia (e.g., occurring at the time slices for approximately 1490 ms and 4100 ms) may denote noise at the time slice due to the generally unfocused energy associated therewith.

Figure 4:
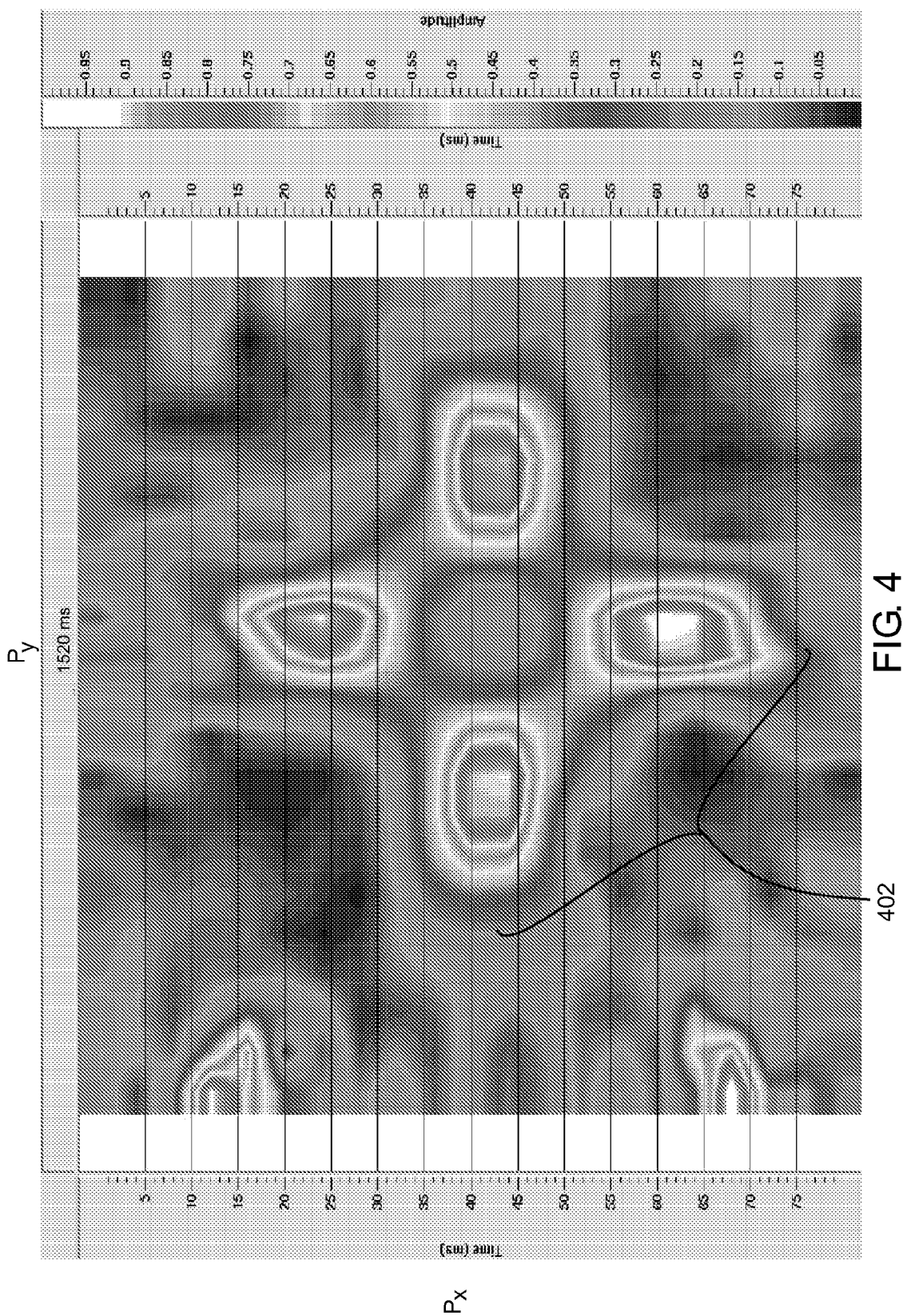
FIG. 4 is an exemplary time slice at 1520 ms illustrating edge effects in accordance with an embodiment of the present invention, where the unfocused distribution of amplitudes results in a high rotational moment of inertia as shown in FIG. 3 at 1520 ms.
Figure 5:
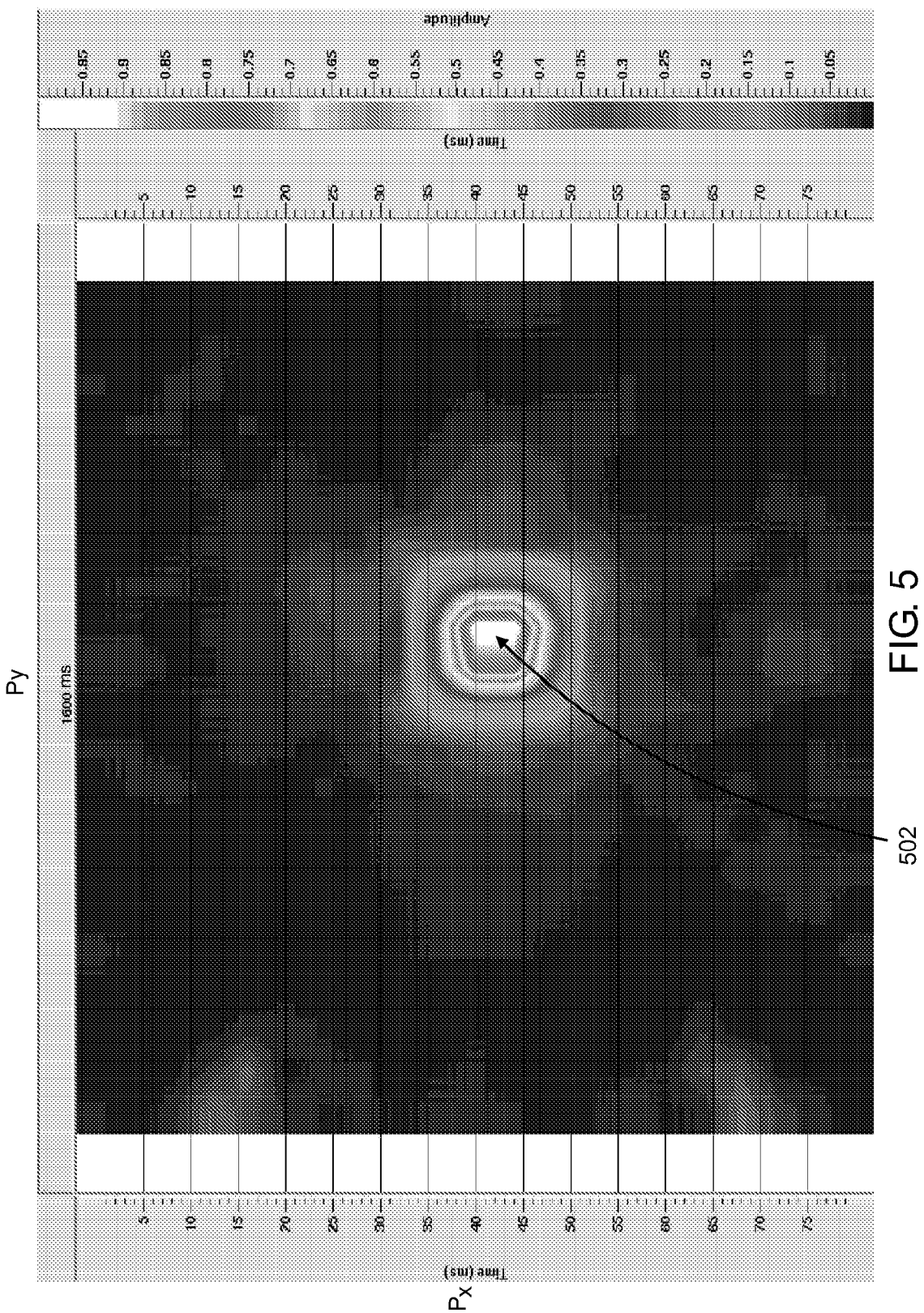
FIG. 5 is an exemplary time slice at 1600 ms illustrating a seismic event in accordance with an embodiment of the present invention, where the focused distribution of amplitudes results in a low rotational moment of inertia as shown in FIG. 3 at 1600 ms.

FIG. 4 is an exemplary time slice at 1520 ms from an envelope cube illustrating edge effects as described above. The unfocused distribution 402 of amplitudes results in a high rotational moment of inertia as shown in FIG. 3 at 1520 ms. In contrast, FIG. 5 is an exemplary time slice at 1600 ms illustrating a seismic event 502. The focused distribution of amplitudes at the seismic event 502 results in a low rotational moment of inertia as shown in FIG. 3 at 1600 ms.

FIG. 2 is a flow diagram 200 illustrating exemplary operations for applying the tau-P envelope templates 120 calculated in FIG. 1 in an effort to remove aliasing energy from the tau-P data 108 before conducting the inverse transformation. For each frequency band $i_{fb}$ in step 202, a decision may be made at step 204 whether the current frequency band is the lowest frequency band ($i_{fb}=1$).

If the current frequency band is the lowest frequency band, then for each time slice at step 206, the moment of inertia 132 may be compared to an inertia threshold value. The inertia threshold value may be a preset value or, for some embodiments, may be user-selectable. If the moment of inertia 132 is greater than the inertia threshold value for a particular time slice, than the data at that particular time slice of the envelope cube for the lowest frequency band may be replaced at step 210 with all zeroes or values close to zero. In other words, the large moment of inertia for this particular time slice indicated this time slice was noisy and/or had artifacts, such as edge effects. This particular time slice in the envelope may be zeroed or attenuated in an effort to provide a low frequency cube (free of edge effects and noise) that can function as a template for higher frequency cubes. Conversely, if the moment of inertia 132 is less than the inertia threshold value for a certain time slice, then the data at that certain time slice of the envelope cube for the lowest frequency band may remain unchanged. In other words, the small moment of inertia for this certain time slice indicated this time slice may contain a seismic event.

The attenuation of time slices having large moments of inertia at steps 208 and 210 may create an envelope mask from the envelope cube of the lowest frequency band. At step 212, the envelope mask may be multiplied with the tau-P data 108 from the lowest frequency band ($i_{fb}=1$).

Figure 6A:
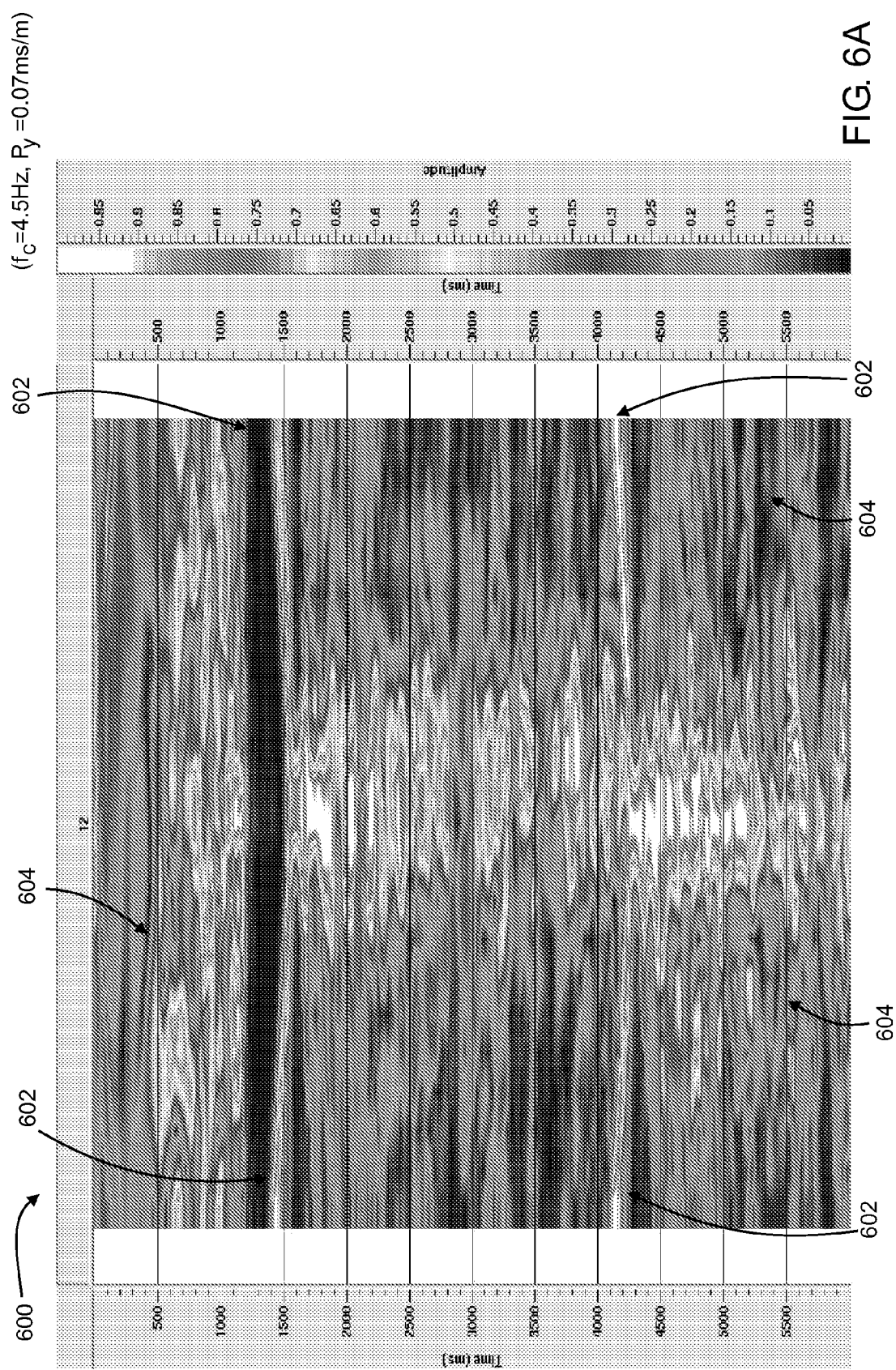
FIGS. 6A-C illustrate exemplary tau-$P_x$ slices of an envelope with a center frequency of 4.5 Hz after time slice normalization, after amplitude filtering, and after elimination of edge effects, respectively, in accordance with embodiments of the present invention.
Figure 6B:
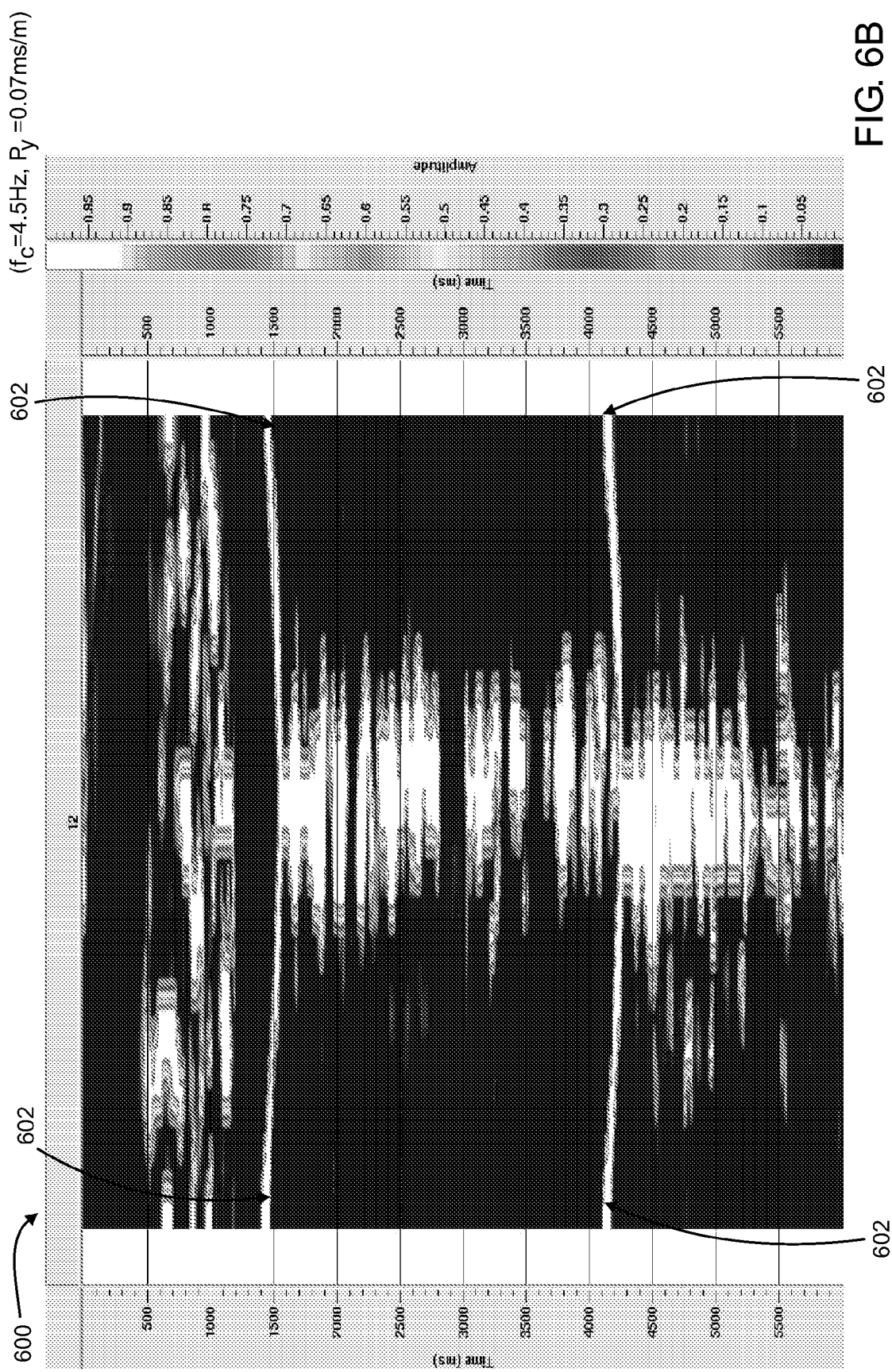
Figure 6C:
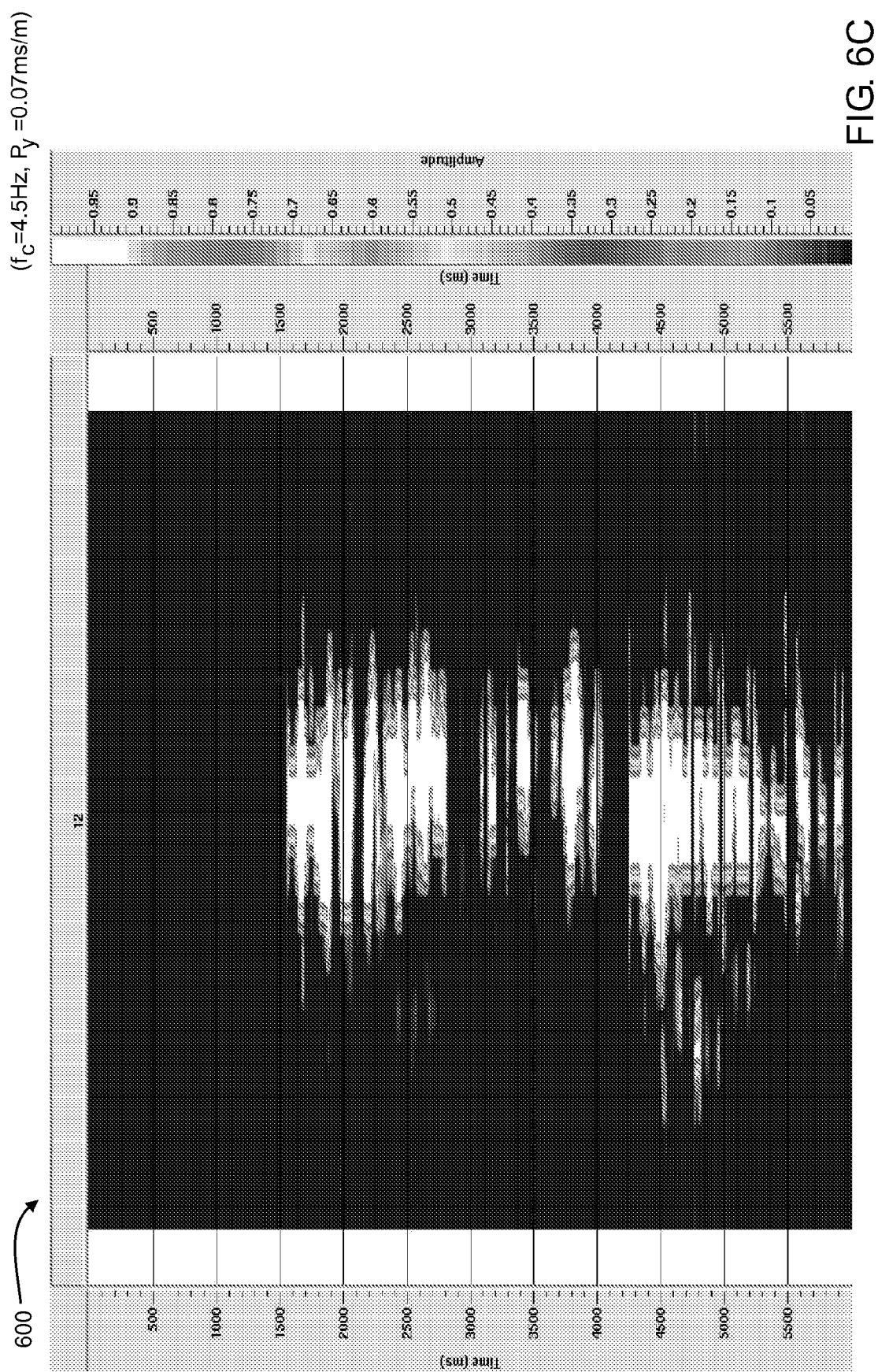

As an example of developing the envelope mask for some embodiments, FIG. 6A illustrates an exemplary tau-$P_x$ slice 600 of an envelope cube of the lowest frequency band after time slice normalization at step 114 and a copy is made at step 122. In FIG. 6A, the center frequency of the envelope cube is 4.5 Hz and $P_y$ is 0.07 ms/m for the tau-$P_x$ slice 600. Edge effects 602 are clearly visible along the edges of the tau-$P_x$ slice 600, and unfocused noise energy 604 permeates the slice, as well. FIG. 6B illustrates the same tau-$P_x$ slice 600 after applying the amplitude filter for the low frequency cube at step 126 for all of the time slices. The edge effects 602 are still present, but the noise energy 604 below the threshold value has been removed or at least attenuated. FIG. 6C illustrates the same tau-$P_x$ slice 600 as FIG. 6B after the edge effects 602 have been removed by calculating the moments of inertia 132 at step 130, comparing the moments of inertia 132 to the inertia threshold value at step 208 for all the time slices, and attenuating the envelope at step 210 for any of the time slices where the moment of inertia is greater than the inertia threshold value. Therefore, FIG. 6C illustrates a tau-$P_x$ slice of the envelope mask for $P_y$ equal to 0.07 ms/m.

If the current frequency band ($i_{fb}$) is not the lowest frequency band ($i_{fb} \ne 1$) at step 204, then the envelope cube for the current frequency band (env($i_{fb}$)) may be multiplied with the envelope cube for the previous frequency band (env($i_{fb}-1$)) at step 214. The result may be stored as a new envelope cube for the current frequency band (env'($i_{fb}$)) to be used in subsequent operations for higher frequency bands. For example, if $i_{fb}=2$, then the envelope cube for the second lowest frequency band (env(2)) may be multiplied with the envelope mask for the lowest frequency band ($i_{fb}=1$) and stored for subsequent multiplications. In this manner, the envelope cube for the lowest frequency band may serve as a template for the other envelope cubes in higher frequency bands by rejecting energy in areas where the low frequency cube has little or no energy, even if high amplitude aliased energy survived the amplitude filtering step in higher frequency bands.

Figure 7A:
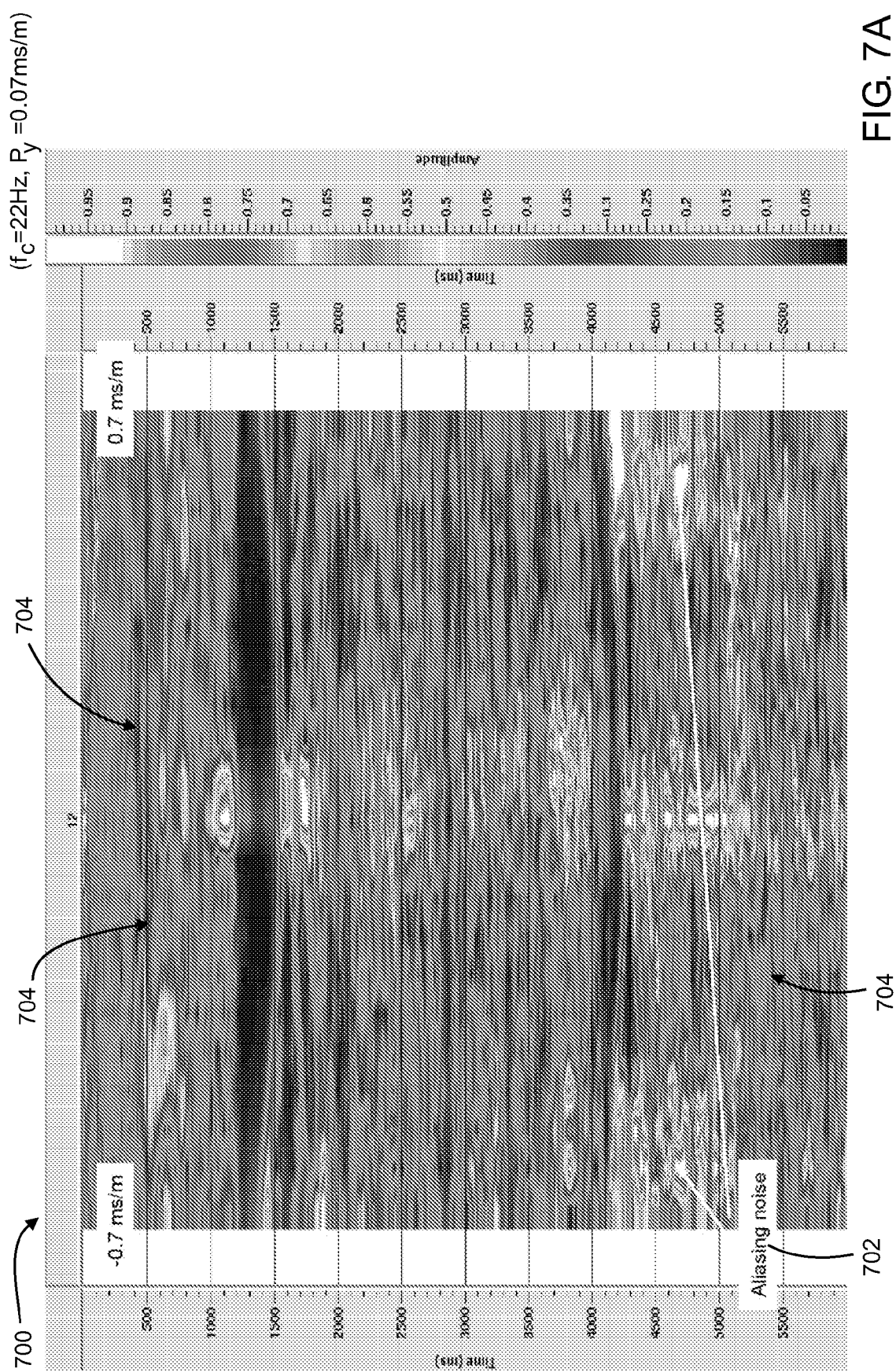
FIGS. 7A-C illustrate exemplary tau-$P_x$ slices of an envelope with a center frequency of 22 Hz after time slice normalization, after amplitude filtering, and after elimination of edge effects and aliasing noise, respectively, in accordance with embodiments of the present invention.
Figure 7B:
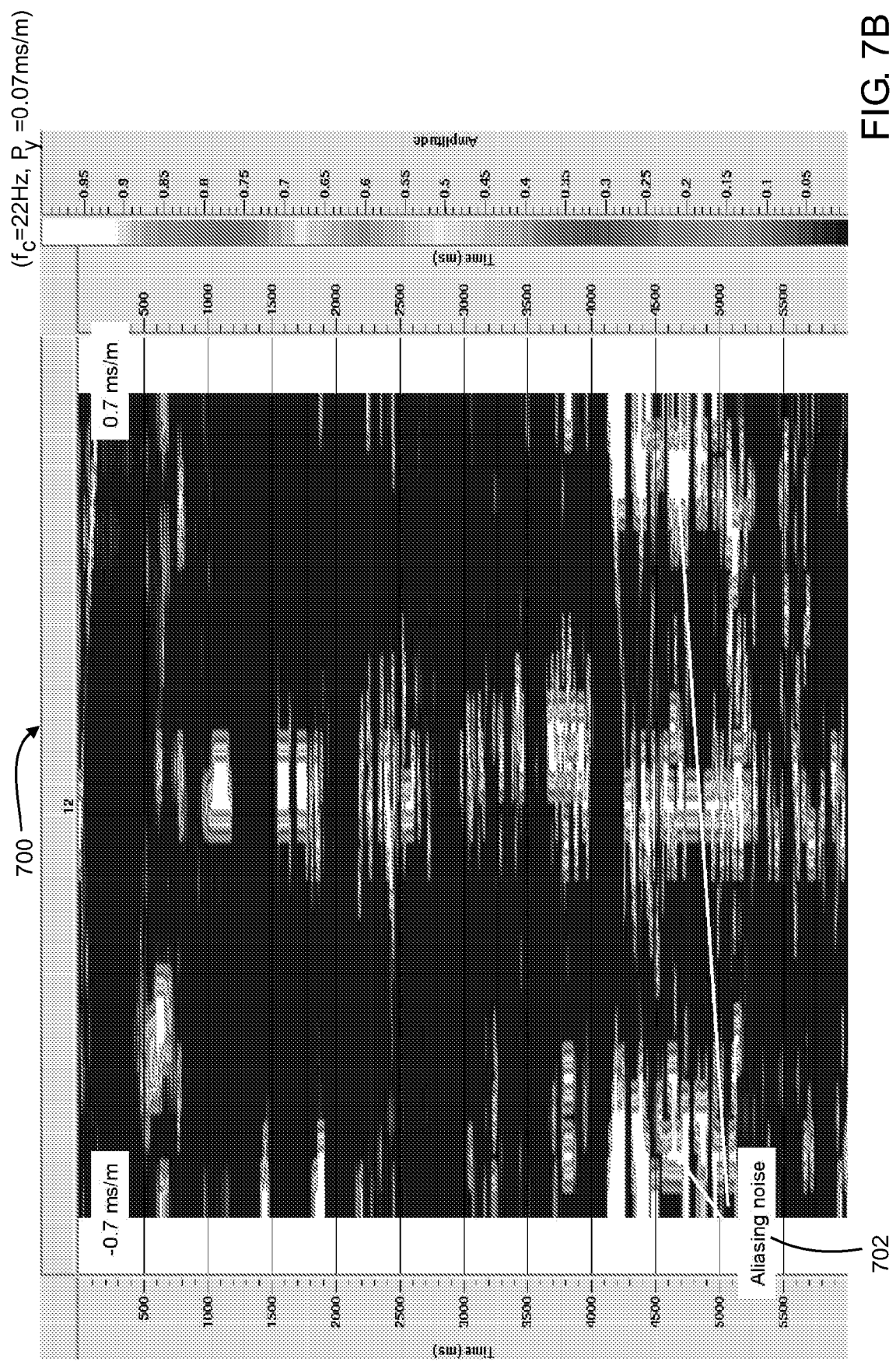
Figure 7C:
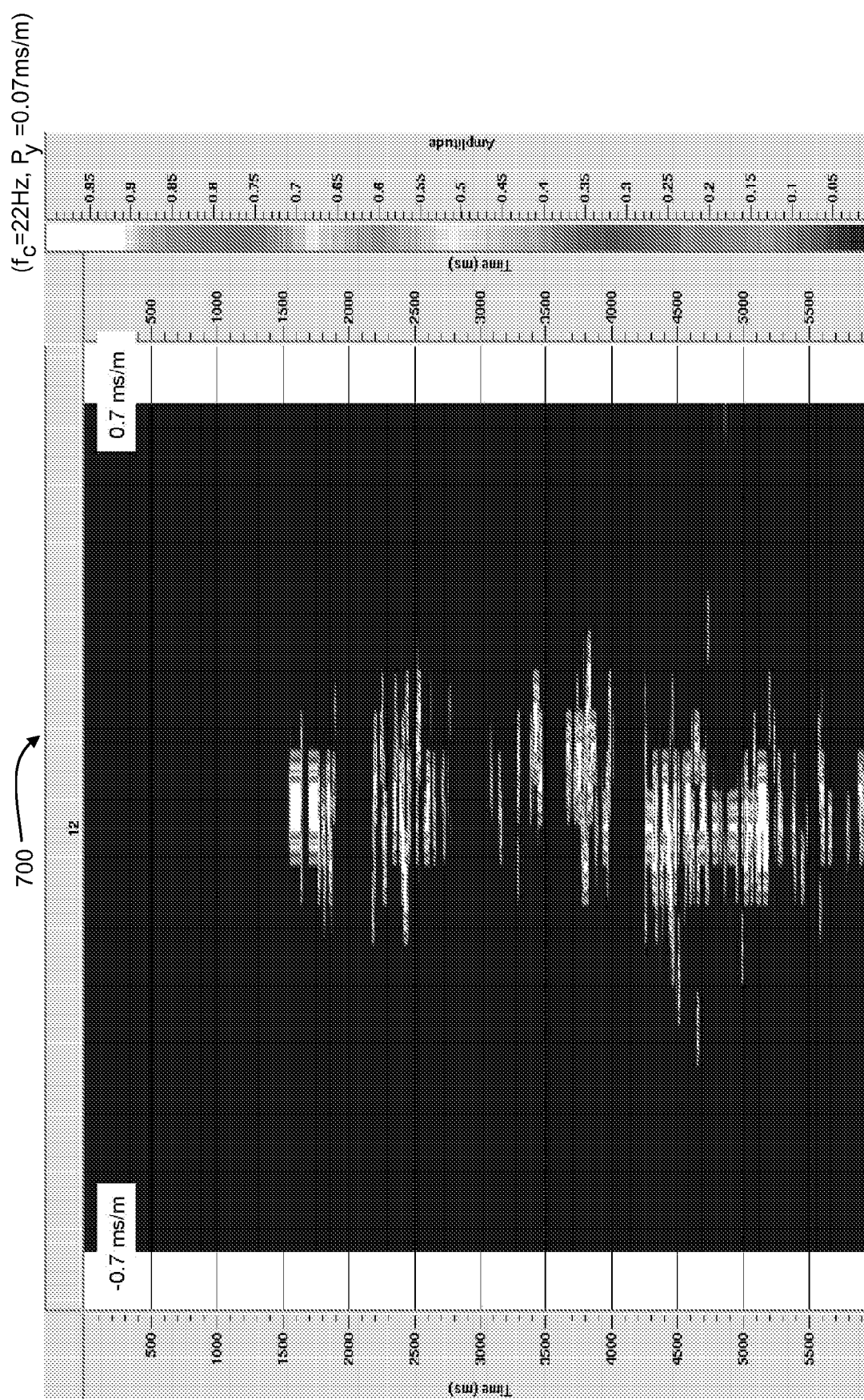

As an example of generating the new envelope cube for the current frequency band (env'($i_{fb}$)) for some embodiments, FIG. 7A illustrates an exemplary tau-$P_x$ slice 700 of an envelope cube that does not correspond to the lowest frequency band ($i_{fb} \ne 1$) after time slice normalization at step 114. In FIG. 7A, the center frequency of the envelope cube is 22 Hz and $P_y$ is 0.07 ms/m for the tau-$P_x$ slice 700. Aliasing noise 702 and distributed unfocused noise energy 704 are present in the tau-$P_x$ slice 700. FIG. 7B illustrates the same tau-$P_x$ slice 700 after applying the amplitude filter for the higher frequency cube at step 118 for all of the time slices. The aliasing noise 702 is still present, but the noise energy 704 below the threshold value has been removed or at least attenuated. FIG. 7C illustrates the same tau-$P_x$ slice 700 as FIG. 7B after the aliasing noise 702 has been removed by multiplying the envelope cube for the current frequency band (env($i_{fb}$)) with the envelope cube for the previous frequency band (env($i_{fb}-1$)) at step 214. Therefore, FIG. 7C illustrates a tau-$P_x$ slice of the new envelope cube (env'($i_{fb}$)) for $P_y$ equal to 0.07 ms/m.

At step 216, the tau-P data 108 for the current frequency band may be multiplied with the new envelope cube (env'($i_{fb}$)) in an effort to remove the aliased energy from the tau-P domain data. Also at step 216, the tau-P domain result may be summed with the tau-P domain result from the previous frequency band ($i_{fb}-1$) in an effort to re-compose the processed decomposed tau-P data.

Once all of the frequency bands have been processed and summed over frequency in step 202, the processed tau-P data should no longer be divided into different frequency bands. At step 218, the linear inverse Radon transform may be performed to transform the tau-P domain data back into the time-offset domain. The resulting seismic data should be free from aliasing noise.

Figure 8A:
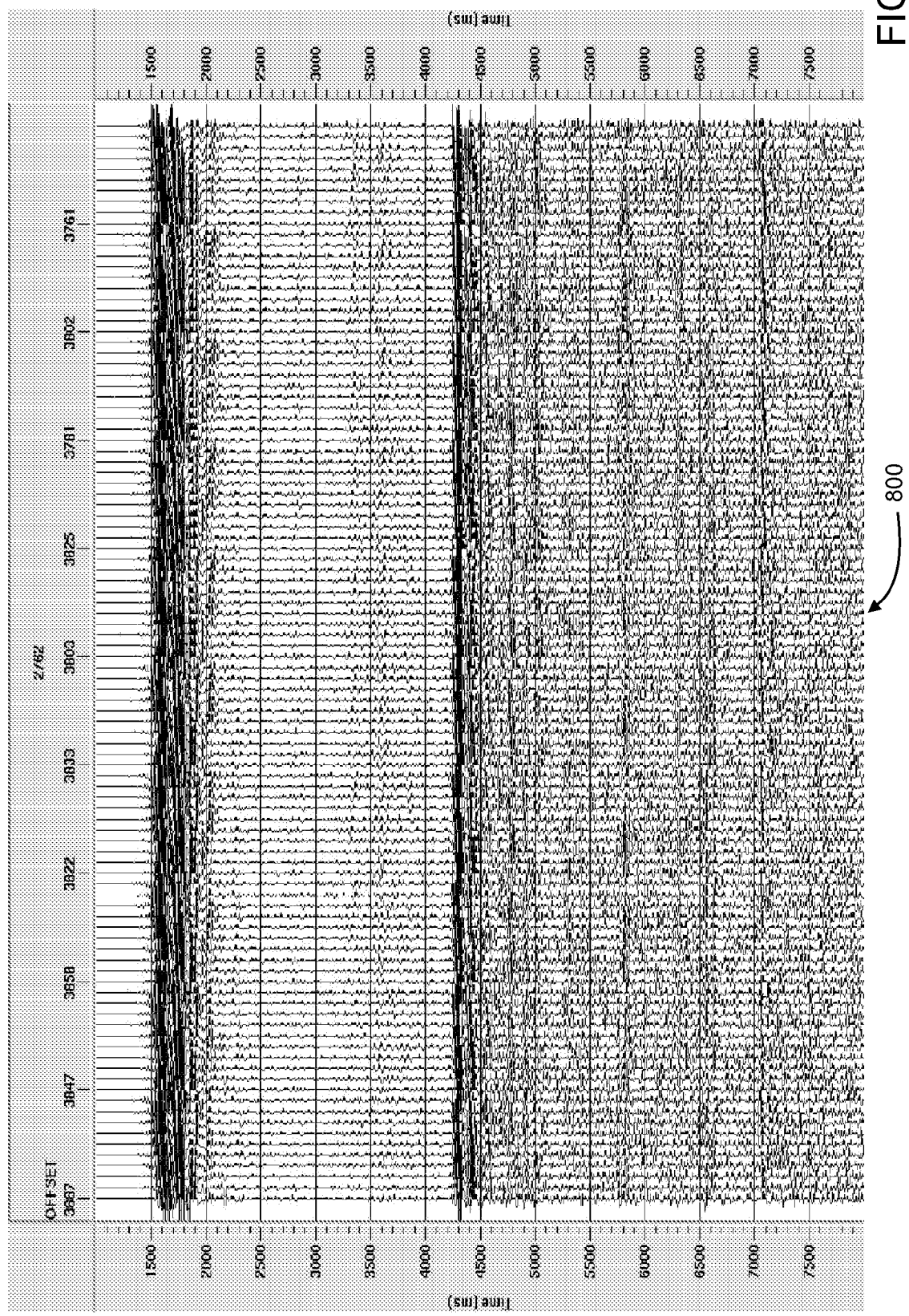
FIG. 8A illustrates an exemplary input test data cube from a common receiver record in accordance with embodiments of the present invention.
Figure 8B:
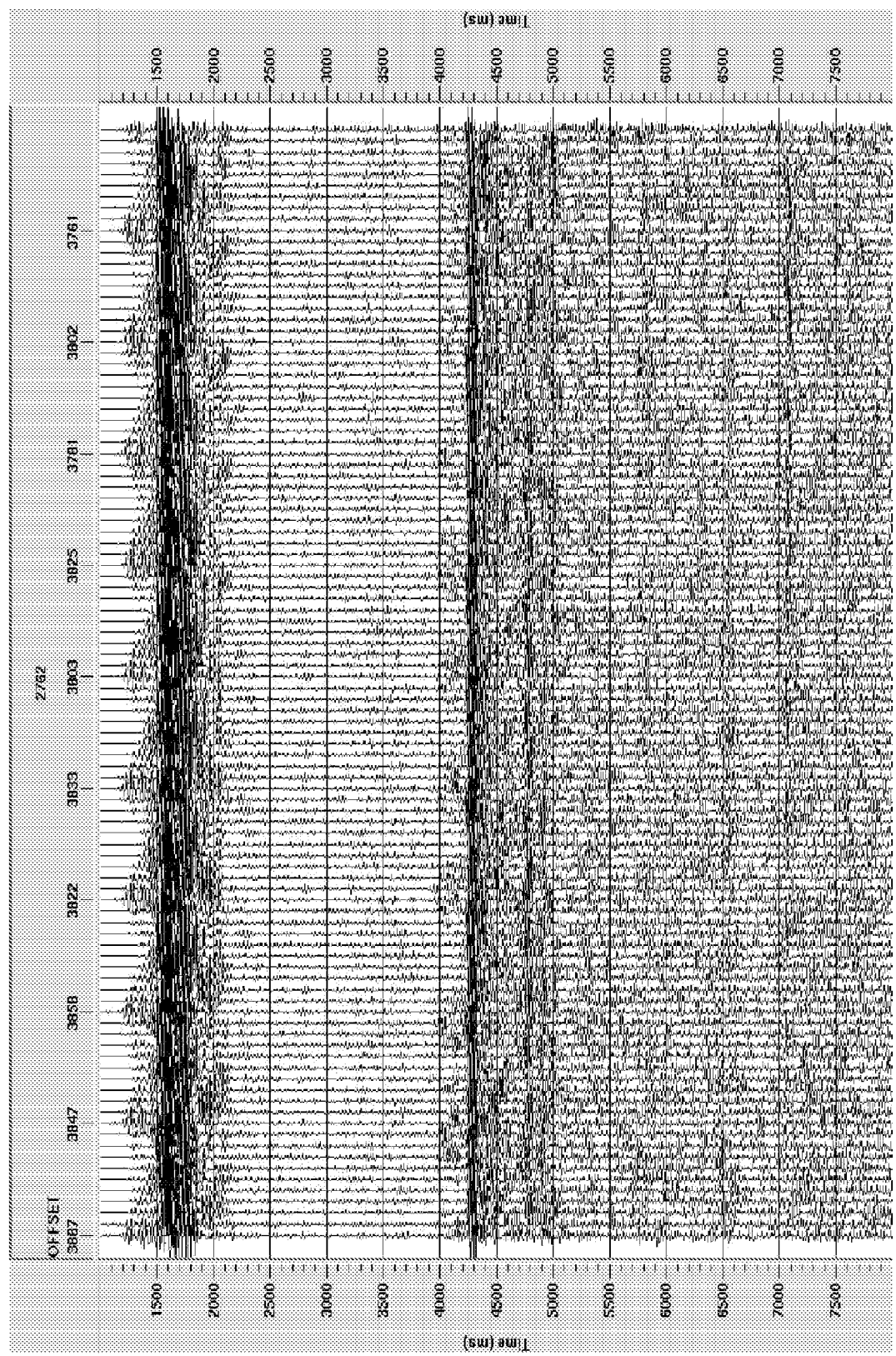
FIGS. 8B-8C illustrate the test data cube of FIG. 8A after forward and inverse tau-P transformation without and with anti-aliasing being applied as described above, respectively, in accordance with embodiments of the present invention.

To illustrate the advantages of the techniques described above, FIG. 8A illustrates an exemplary input seismic data cube 800 from a common receiver record with 10 inline and 10 cross-line traces arranged in a two-dimensional form. In FIG. 8A, the inline offset range is 766 to 1178 m, and the cross-line offset range is 3199 to 3704 m. Determining seismic events directly from this time-offset data may be challenging. FIG. 8B illustrates the data cube 802 after forward and inverse Radon transforming the data cube 800 of FIG. 8A to/from the tau-P domain without using the envelope cube for the lowest frequency band as a template for the higher frequency bands. Aliased energy in the tau-P domain may have led to the more incoherent data of FIG. 8B, where seismic events may be even more difficult to determine, thereby rendering the tau-P method unusable.

Figure 8C:
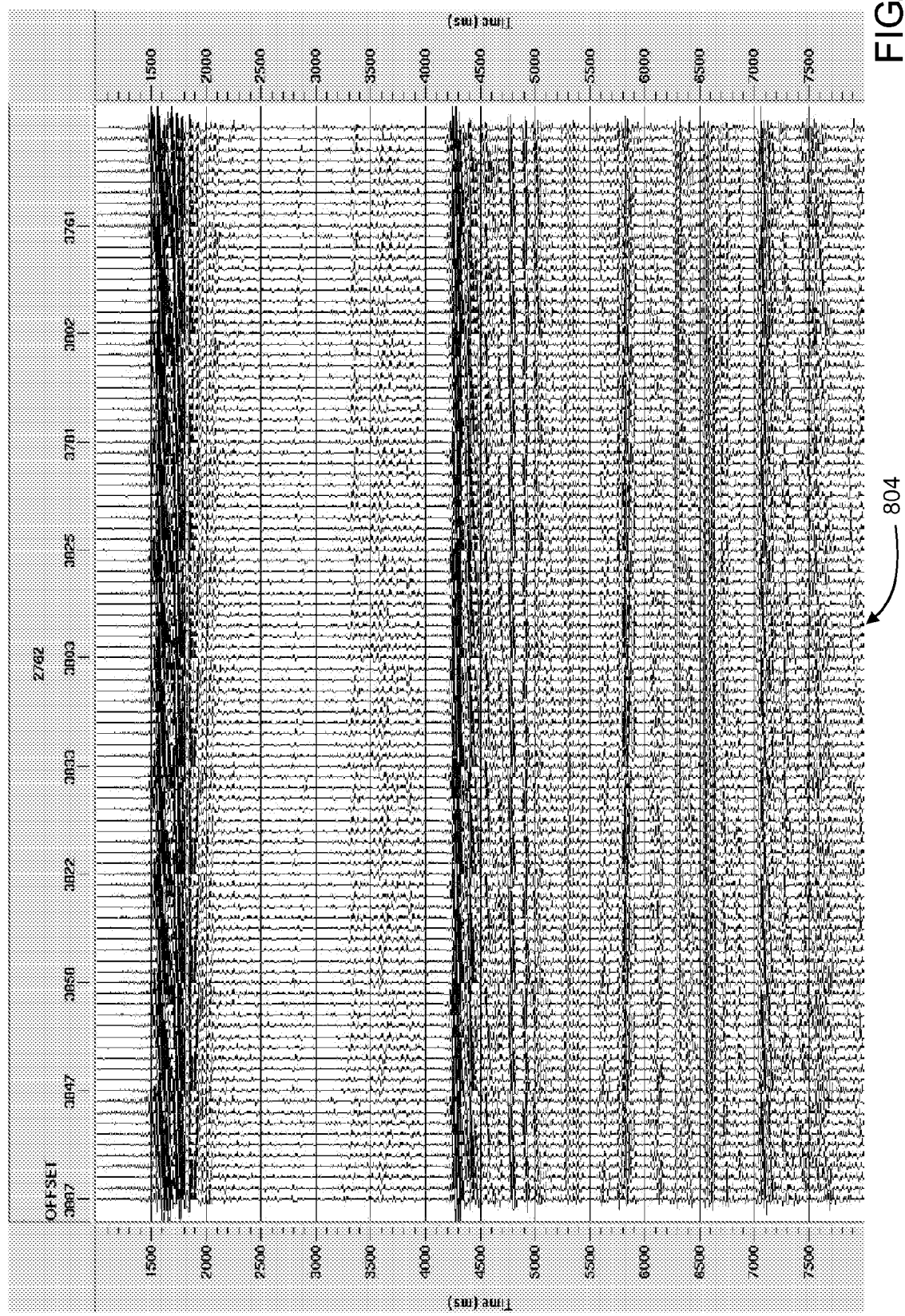

In contrast with FIGS. 8A and 8B, FIG. 8C illustrates the test data cube 804 after forward and inverse Radon transforming the data cube 800 of FIG. 8A to/from the tau-P domain using the techniques described above with respect to FIGS. 1 and 2. By removing the aliasing noise in the tau-P domain, seismic events may be more easily determined in the test data cube 804, where the wavelets appear staggered in time according to the positional offset. Unfocused noise energy has also been removed from the data cube 800 in producing the cleaner seismic data cube 804 of FIG. 8C.

While the foregoing is directed to embodiments of the present invention, other and further embodiments of the invention may be devised without departing from the basic scope thereof, and the scope thereof is determined by the claims that follow.

The invention claimed is:

1. A computer-readable medium containing a program for removing aliasing noise from three-dimensional (3-D) time-slowness (tau-P) data, which, when executed by a processor, performs operations comprising:

decomposing the tau-P data into a plurality of frequency bands, wherein a template frequency band in the plurality of frequency bands does not contain aliasing noise and at least a portion of the other frequency bands constitute a subset of frequency bands for processing;

calculating an envelope for the template frequency band and for each of the frequency bands in the subset to generate a plurality of envelope cuboids;

for each frequency band in the subset from the lowest to the highest frequency band in the subset, multiplying an envelope cuboid associated with the present frequency band with an envelope cuboid associated with an adjacent lower frequency band or with the template frequency band to produce an envelope mask for the present frequency band, saving the envelope mask as the envelope cuboid associated with the present frequency band, and multiplying the envelope mask for the present frequency band with the tau-P data for the present frequency band to produce processed tau-P data for the present frequency band such that the aliasing noise is removed; and summing the tau-P data for the template frequency band and the processed tau-P data for each of the frequency bands in the subset to produce tau-P data without aliasing noise.

2. The computer-readable medium of claim 1, wherein the operations further comprise:

normalizing each time slice within each of the plurality of envelope cuboids; and applying an amplitude filter to each normalized time slice within each of the plurality of envelope cuboids such that envelope amplitudes below a threshold value are attenuated or zeroed and envelope amplitudes above the threshold value are set to one before multiplying the envelope cuboids.

3. The computer-readable medium of claim 1, wherein the operations further comprise removing edge effects from the template envelope cuboid before multiplying the envelope cuboids.

4. The computer-readable medium of claim 3, wherein the operations further comprise:

calculating a center of amplitude for each time slice in the envelope cuboid associated with the template frequency band;

calculating a rotational moment of inertia with respect to the center of amplitude for each time slice in the template envelope cuboid; and for each time slice in the template envelope cuboid, attenuating or zeroing the time slice if the moment of inertia is greater than an inertia threshold value before multiplying the envelope cuboids.

5. The computer-readable medium of claim 4, wherein the operations further comprise:

normalizing each time slice within the template envelope cuboid; and applying an amplitude filter to each normalized time slice within the template envelope cuboid such that envelope amplitudes below a template threshold value are attenuated or zeroed and envelope amplitudes above the template threshold value are set to one before calculating the center of amplitude.

6. The computer-readable medium of claim 1, wherein the operations further comprise performing a linear Radon transform on a window of time-offset data to form the 3-D tau-P data.

7. The computer-readable medium of claim 1, wherein the operations further comprise performing a linear inverse Radon transform on the tau-P data without aliasing noise to produce time-offset data without aliasing noise.

* * * * *